US012421870B1

(12) United States Patent
Snyder et al.

(10) Patent No.: US 12,421,870 B1
(45) Date of Patent: Sep. 23, 2025

(54) PIN MOUNTED CERAMIC MATRIX COMPOSITE HEAT SHIELDS WITH IMPINGEMENT COOLING

(71) Applicant: Rolls-Royce Corporation, Indianapolis, IN (US)

(72) Inventors: Clark J. Snyder, Indianapolis, IN (US); Aaron D. Sippel, Indianapolis, IN (US); David J. Thomas, Indianapolis, IN (US); Ted J. Freeman, Indianapolis, IN (US)

(73) Assignee: Rolls-Royce Corporation, Indianapolis, IN (US)

( * ) Notice: Subject to any disclaimer, the term of this patent is extended or adjusted under 35 U.S.C. 154(b) by 0 days.

(21) Appl. No.: 18/651,642

(22) Filed: Apr. 30, 2024

(51) Int. Cl.
*F01D 11/08* (2006.01)
*F01D 25/12* (2006.01)
*F01D 25/24* (2006.01)

(52) U.S. Cl.
CPC .......... *F01D 25/12* (2013.01); *F01D 25/243* (2013.01); *F05D 2230/64* (2013.01); *F05D 2260/232* (2013.01)

(58) Field of Classification Search
CPC ........ F01D 11/08; F01D 25/24; F01D 25/246; F01D 25/243; F05D 2240/11; F05D 2260/31; F05D 2260/232; F05D 2260/201; F05D 2300/6033
See application file for complete search history.

(56) References Cited

U.S. PATENT DOCUMENTS

| | | | |
|---|---|---|---|
| 812,350 | A | 2/1906 | Walton |
| 3,066,911 | A | 12/1962 | Anderson et al. |
| 3,807,891 | A | 4/1974 | McDow et al. |
| 3,880,435 | A | 4/1975 | Thornbald |
| 4,087,199 | A | 5/1978 | Hemsworth et al. |
| 4,472,108 | A | 9/1984 | Pask |
| 4,676,715 | A | 6/1987 | Imbault et al. |
| 4,863,345 | A | 9/1989 | Thompson et al. |
| 5,080,557 | A | 1/1992 | Berger |
| 5,116,199 | A | 5/1992 | Ciokajlo |
| 5,129,783 | A | 7/1992 | Hayton |
| 5,165,847 | A | 11/1992 | Proctor et al. |
| 5,169,287 | A | 12/1992 | Proctor et al. |
| 5,203,673 | A | 4/1993 | Evans |
| 5,273,396 | A | 12/1993 | Albrecht et al. |
| 5,295,787 | A | 3/1994 | Leonard et al. |

(Continued)

FOREIGN PATENT DOCUMENTS

| | | |
|---|---|---|
| EP | 515130 A1 | 11/1992 |
| EP | 1965031 A2 | 9/2008 |

(Continued)

*Primary Examiner* — Nathaniel E Wiehe
*Assistant Examiner* — Maxime M Adjagbe
(74) *Attorney, Agent, or Firm* — Barnes & Thornburg (57) ABSTRACT

An assembly adapted for use in a gas turbine engine includes a blade track segment, a carrier segment, and a pin. The blade track segment defines a portion of a gas path of the gas turbine engine. The carrier segment supports the blade track segment to locate the blade track segment radially outward of the axis. The pin couples the blade track segment to the carrier segment. The carrier segment may include cooling passageways to conduct cooling air to preselected cooling areas located on the blade track segment.

15 Claims, 8 Drawing Sheets

(56) References Cited

U.S. PATENT DOCUMENTS

| | | |
|---|---|---|
| 5,380,150 A | 1/1995 | Stahl |
| 5,459,995 A | 10/1995 | Norton et al. |
| 5,562,408 A | 10/1996 | Proctor et al. |
| 5,580,219 A | 12/1996 | Frey et al. |
| 5,584,651 A | 12/1996 | Pietraszkiewicz et al. |
| 5,591,003 A | 1/1997 | Boyd et al. |
| 5,593,276 A | 1/1997 | Proctor et al. |
| 5,609,469 A | 3/1997 | Worley et al. |
| 6,062,813 A | 5/2000 | Halliwell et al. |
| 6,113,349 A | 9/2000 | Bagepalli et al. |
| 6,142,731 A | 11/2000 | Dewis et al. |
| 6,666,645 B1 | 12/2003 | Arilla et al. |
| 6,679,680 B2 | 1/2004 | Um et al. |
| 6,702,550 B2 | 3/2004 | Darkins, Jr. et al. |
| 6,821,085 B2 | 11/2004 | Darkins et al. |
| 6,877,952 B2 | 4/2005 | Wilson |
| 6,884,026 B2 | 4/2005 | Glynn et al. |
| 7,104,758 B2 | 9/2006 | Brock et al. |
| 7,207,771 B2 | 4/2007 | Synnott et al. |
| 7,210,899 B2 | 5/2007 | Wilson, Jr. |
| 7,217,089 B2 | 5/2007 | Durocher et al. |
| 7,374,395 B2 | 5/2008 | Durocher et al. |
| 7,494,317 B2 | 2/2009 | Keller et al. |
| 7,513,740 B1 | 4/2009 | Hervy et al. |
| 7,534,086 B2 | 5/2009 | Mazzola et al. |
| 7,600,967 B2 | 10/2009 | Pezzetti, Jr. et al. |
| 7,726,936 B2 | 6/2010 | Keller et al. |
| 7,753,643 B2 | 7/2010 | Gonzalez et al. |
| 7,771,159 B2 | 8/2010 | Johnson et al. |
| 7,901,186 B2 | 3/2011 | Cornett et al. |
| 8,123,473 B2 | 2/2012 | Shapiro |
| 8,206,087 B2 | 6/2012 | Campbell et al. |
| 8,303,245 B2 | 11/2012 | Foster et al. |
| 8,388,309 B2 | 3/2013 | Marra et al. |
| 8,459,952 B2 | 6/2013 | Behnke et al. |
| 8,641,371 B2 | 2/2014 | Nakamura et al. |
| 8,651,497 B2 | 2/2014 | Tholen et al. |
| 8,684,680 B2 | 4/2014 | Martin et al. |
| 8,784,041 B2 | 7/2014 | Durocher et al. |
| 8,790,067 B2 | 7/2014 | Mccaffrey et al. |
| 8,845,285 B2 | 9/2014 | Weber et al. |
| 8,905,708 B2 | 12/2014 | Weber et al. |
| 8,905,709 B2 | 12/2014 | Dziech et al. |
| 8,944,756 B2 | 2/2015 | Lagueux |
| 8,979,489 B2 | 3/2015 | Taillant et al. |
| 9,079,245 B2 | 7/2015 | Durocher et al. |
| 9,534,500 B2 | 1/2017 | Bouchard et al. |
| 9,587,504 B2 | 3/2017 | Mccaffrey et al. |
| 9,587,517 B2 | 3/2017 | Vetters et al. |
| 9,708,922 B1 | 7/2017 | Davis et al. |
| 9,714,580 B2 | 7/2017 | Slavens et al. |
| 9,745,854 B2 | 8/2017 | Baldiga et al. |
| 9,759,079 B2 | 9/2017 | Sippel et al. |
| 9,863,265 B2 | 1/2018 | Stapleton |
| 9,863,323 B2 | 1/2018 | Kirtley et al. |
| 9,869,201 B2 | 1/2018 | Dyson et al. |
| 9,874,104 B2 | 1/2018 | Shapiro |
| 9,915,162 B2 | 3/2018 | Duguay |
| 9,945,484 B2 | 4/2018 | Moehrle et al. |
| 9,957,827 B2 | 5/2018 | Davis et al. |
| 9,982,550 B2 | 5/2018 | Davis |
| 9,988,919 B2 | 6/2018 | Davis et al. |
| 9,988,923 B2 | 6/2018 | Snyder et al. |
| 10,012,099 B2 | 7/2018 | Cetel et al. |
| 10,024,193 B2 | 7/2018 | Shapiro |
| 10,030,541 B2 | 7/2018 | Vetters et al. |
| 10,072,517 B2 | 9/2018 | Boeke et al. |
| 10,082,039 B2 | 9/2018 | Hanson |
| 10,082,085 B2 | 9/2018 | Thomas et al. |
| 10,087,771 B2 | 10/2018 | Mcgarrah |
| 10,100,660 B2 | 10/2018 | Sippel et al. |
| 10,132,197 B2 | 11/2018 | Heitman et al. |
| 10,138,747 B2 | 11/2018 | Dev et al. |
| 10,138,750 B2 | 11/2018 | Mccaffrey et al. |
| 10,167,957 B2 | 1/2019 | Davis et al. |
| 10,174,628 B2 | 1/2019 | Humhauser et al. |
| 10,202,863 B2 | 2/2019 | Davis et al. |
| 10,221,715 B2 | 3/2019 | Varney et al. |
| 10,265,806 B2 | 4/2019 | Cui et al. |
| 10,281,045 B2 | 5/2019 | Sippel et al. |
| 10,301,955 B2 | 5/2019 | Vetters et al. |
| 10,301,960 B2 | 5/2019 | Stapleton et al. |
| 10,370,991 B2 | 8/2019 | Wilson et al. |
| 10,378,385 B2 | 8/2019 | Tesson et al. |
| 10,378,386 B2 | 8/2019 | Roussille et al. |
| 10,415,426 B2 | 9/2019 | Quennehen et al. |
| 10,415,427 B2 | 9/2019 | Quennehen et al. |
| 10,422,241 B2 | 9/2019 | Mccaffrey et al. |
| 10,428,688 B2 | 10/2019 | Quennehen et al. |
| 10,428,953 B2 | 10/2019 | Lutjen et al. |
| 10,443,419 B2 | 10/2019 | Thomas et al. |
| 10,443,420 B2 | 10/2019 | Sippel et al. |
| 10,465,545 B2 | 11/2019 | Cetel et al. |
| 10,533,446 B2 | 1/2020 | Barak et al. |
| 10,550,706 B2 | 2/2020 | Lutjen et al. |
| 10,577,963 B2 | 3/2020 | Mccaffrey |
| 10,577,977 B2 | 3/2020 | Baucco |
| 10,584,605 B2 | 3/2020 | Sippel et al. |
| 10,590,803 B2 | 3/2020 | Quennehen et al. |
| 10,598,045 B2 | 3/2020 | Tableau et al. |
| 10,605,120 B2 | 3/2020 | Quennehen et al. |
| 10,619,517 B2 | 4/2020 | Quennehen et al. |
| 10,626,745 B2 | 4/2020 | Roussille et al. |
| 10,633,994 B2 | 4/2020 | Barker |
| 10,648,362 B2 | 5/2020 | Groves, II et al. |
| 10,655,495 B2 | 5/2020 | Groves, II et al. |
| 10,655,501 B2 | 5/2020 | Lepretre et al. |
| 10,662,794 B2 | 5/2020 | Das |
| 10,689,998 B2 | 6/2020 | Stapleton et al. |
| 10,690,007 B2 | 6/2020 | Quennehen et al. |
| 10,704,404 B2 | 7/2020 | Shi et al. |
| 10,718,226 B2 | 7/2020 | Vetters et al. |
| 10,724,399 B2 | 7/2020 | Carlin et al. |
| 10,731,494 B2 | 8/2020 | Dev et al. |
| 10,731,509 B2 | 8/2020 | Correia et al. |
| 10,738,643 B2 | 8/2020 | Mccaffrey et al. |
| 10,753,221 B2 | 8/2020 | Barker et al. |
| 10,787,924 B2 | 9/2020 | Quennehen et al. |
| 10,794,204 B2 | 10/2020 | Fitzpatrick et al. |
| 10,801,345 B2 | 10/2020 | Clum et al. |
| 10,801,349 B2 | 10/2020 | Mccaffrey |
| 10,815,807 B2 | 10/2020 | Vantassel et al. |
| 10,815,810 B2 | 10/2020 | Barker et al. |
| 10,830,357 B2 | 11/2020 | Mccaffrey et al. |
| 10,890,079 B2 | 1/2021 | Propheter-Hinckley et al. |
| 10,907,487 B2 | 2/2021 | Zurmehly et al. |
| 10,907,501 B2 | 2/2021 | Filippi et al. |
| 10,934,872 B2 | 3/2021 | Tableau et al. |
| 10,934,873 B2 | 3/2021 | Sarawate et al. |
| 10,968,761 B2 | 4/2021 | Barker et al. |
| 10,968,777 B2 | 4/2021 | Propheter-Hinckley et al. |
| 10,982,559 B2 | 4/2021 | Filippi |
| 11,002,144 B2 | 5/2021 | Azad et al. |
| 11,015,613 B2 | 5/2021 | Kerns et al. |
| 11,021,988 B2 | 6/2021 | Tableau et al. |
| 11,021,990 B2 | 6/2021 | Filippi |
| 11,028,720 B2 | 6/2021 | Tableau et al. |
| 11,041,399 B2 | 6/2021 | Lutjen et al. |
| 11,047,245 B2 | 6/2021 | Mccaffrey |
| 11,066,947 B2 | 7/2021 | Sippel et al. |
| 11,073,045 B2 | 7/2021 | Sippel et al. |
| 11,078,804 B2 | 8/2021 | Tableau et al. |
| 11,085,316 B2 | 8/2021 | Barker et al. |
| 11,085,317 B2 | 8/2021 | Johnson et al. |
| 11,105,215 B2 | 8/2021 | Roy Thill et al. |
| 11,111,794 B2 | 9/2021 | Bitzko et al. |
| 11,111,802 B2 | 9/2021 | Propheter-Hinckley et al. |
| 11,111,822 B2 | 9/2021 | Tableau et al. |
| 11,111,823 B2* | 9/2021 | Jarrossay ............ F01D 11/005 |
| 11,125,096 B2 | 9/2021 | Clark et al. |
| 11,125,098 B2 | 9/2021 | Barker et al. |
| 11,143,050 B2 | 10/2021 | Roy Thill et al. |
| 11,149,574 B2 | 10/2021 | Laroche |
| 11,149,586 B2* | 10/2021 | Duffau ............... F01D 25/005 |

(56) References Cited

U.S. PATENT DOCUMENTS

| | | |
|---|---|---|
| 11,174,747 B2 | 11/2021 | Roy Thill et al. |
| 11,174,795 B2 | 11/2021 | Lutjen et al. |
| 11,181,006 B2 | 11/2021 | Smoke et al. |
| 11,187,094 B2 | 11/2021 | Feldmann et al. |
| 11,215,064 B2 | 1/2022 | Arbona et al. |
| 11,215,065 B2 | 1/2022 | Starr et al. |
| 11,215,081 B2 | 1/2022 | Schilling et al. |
| 11,220,928 B1 * | 1/2022 | Baucco ............... F02C 7/12 |
| 11,248,480 B2 | 2/2022 | Thirumalai et al. |
| 11,255,208 B2 | 2/2022 | Clark et al. |
| 11,255,209 B2 | 2/2022 | Clark et al. |
| 11,286,812 B1 | 3/2022 | Freeman et al. |
| 11,313,242 B2 | 4/2022 | Cetel et al. |
| 11,319,827 B2 | 5/2022 | Clark et al. |
| 11,319,828 B1 | 5/2022 | Freeman et al. |
| 11,326,463 B2 | 5/2022 | Blaney et al. |
| 11,326,470 B2 | 5/2022 | Dyson et al. |
| 11,346,237 B1 | 5/2022 | Freeman et al. |
| 11,346,251 B1 | 5/2022 | Freeman et al. |
| 11,365,635 B2 | 6/2022 | Read et al. |
| 11,441,434 B2 | 9/2022 | Danis et al. |
| 11,441,441 B1 | 9/2022 | Freeman et al. |
| 11,466,585 B2 | 10/2022 | Arbona et al. |
| 11,466,586 B2 | 10/2022 | Sippel et al. |
| 11,499,444 B1 | 11/2022 | Freeman et al. |
| 11,506,085 B2 | 11/2022 | Jarrossay et al. |
| 11,542,825 B2 | 1/2023 | Hauswirth et al. |
| 11,542,827 B2 | 1/2023 | Quennehen et al. |
| 11,624,291 B2 | 4/2023 | Roy Thill et al. |
| 11,624,292 B2 | 4/2023 | Clark et al. |
| 11,629,607 B2 | 4/2023 | Freeman et al. |
| 11,643,939 B2 | 5/2023 | Stoyanov et al. |
| 11,702,948 B2 | 7/2023 | Hock et al. |
| 11,702,949 B2 | 7/2023 | Freeman et al. |
| 11,713,694 B1 | 8/2023 | Freeman et al. |
| 11,732,604 B1 | 8/2023 | Freeman et al. |
| 11,761,351 B2 | 9/2023 | Freeman et al. |
| 11,773,751 B1 | 10/2023 | Freeman et al. |
| 11,781,440 B2 | 10/2023 | Vincent et al. |
| 11,781,448 B1 | 10/2023 | Holleran |
| 11,840,930 B2 | 12/2023 | Propheter-Hinckley et al. |
| 11,840,936 B1 | 12/2023 | Freeman et al. |
| 11,879,349 B2 | 1/2024 | Schilling et al. |
| 2003/0133790 A1 | 7/2003 | Darkins, Jr. et al. |
| 2003/0185674 A1 | 10/2003 | Alford et al. |
| 2008/0131264 A1 | 6/2008 | Lee et al. |
| 2008/0206042 A1 | 8/2008 | Lee et al. |
| 2009/0208284 A1 | 8/2009 | Funnell |
| 2016/0186611 A1 | 6/2016 | Vetters et al. |
| 2016/0186999 A1 | 6/2016 | Freeman et al. |
| 2016/0319688 A1 | 11/2016 | Thibault et al. |
| 2016/0333715 A1 | 11/2016 | Mccaffrey |
| 2017/0268366 A1 | 9/2017 | Mccaffrey et al. |
| 2018/0023408 A1 | 1/2018 | Rice et al. |
| 2018/0051581 A1 | 2/2018 | Quennehen et al. |
| 2018/0051591 A1 | 2/2018 | Quennehen et al. |
| 2018/0073398 A1 * | 3/2018 | Quennehen ............ F01D 25/28 |
| 2018/0080343 A1 | 3/2018 | Groleau et al. |
| 2018/0156069 A1 | 6/2018 | Quennehen et al. |
| 2018/0291769 A1 | 10/2018 | Vetters et al. |
| 2018/0355761 A1 | 12/2018 | Maar |
| 2019/0040758 A1 | 2/2019 | Quennehen et al. |
| 2019/0040761 A1 | 2/2019 | Carlin et al. |
| 2019/0084892 A1 | 3/2019 | Subramanian et al. |
| 2019/0101027 A1 | 4/2019 | Lepretre et al. |
| 2019/0128132 A1 | 5/2019 | Tableau et al. |
| 2020/0003076 A1 | 1/2020 | Feldmann |
| 2020/0063601 A1 * | 2/2020 | Filippi ................ F01D 11/08 |
| 2021/0131300 A1 | 5/2021 | Arbona et al. |
| 2021/0189909 A1 | 6/2021 | Sippel et al. |
| 2022/0003126 A1 | 1/2022 | Roy Thill et al. |
| 2022/0056809 A1 | 2/2022 | Hock et al. |
| 2022/0120198 A1 | 4/2022 | Schilling et al. |
| 2023/0184124 A1 | 6/2023 | Stoyanov et al. |
| 2023/0332506 A1 | 10/2023 | Freeman et al. |
| 2024/0003267 A1 | 1/2024 | Cazin et al. |

FOREIGN PATENT DOCUMENTS

| | | |
|---|---|---|
| EP | 3543468 A1 | 9/2019 |
| FR | 3056636 A1 | 3/2018 |

* cited by examiner

PIN MOUNTED CERAMIC MATRIX COMPOSITE HEAT SHIELDS WITH IMPINGEMENT COOLING

FIELD OF DISCLOSURE

The present disclosure relates generally to gas turbine engines, and more specifically to subassemblies of gas turbine engines including ceramic matrix composite materials.

BACKGROUND

Gas turbine engines are used to power aircraft, watercraft, power generators, and the like. Gas turbine engines typically include a compressor, a combustor, and a turbine. The compressor compresses air drawn into the engine and delivers high pressure air to the combustor. In the combustor, fuel is mixed with the high pressure air and is ignited. Products of the combustion reaction in the combustor are directed into the turbine where work is extracted to drive the compressor and, sometimes, an output shaft. Left-over products of the combustion are exhausted out of the turbine and may provide thrust in some applications.

Compressors and turbines typically include alternating stages of static vane assemblies and rotating wheel assemblies. The rotating wheel assemblies include disks carrying blades around their outer edges. When the rotating wheel assemblies turn, tips of the blades move along blade tracks included in static shrouds that are arranged around the rotating wheel assemblies.

Some shrouds positioned in the turbine may be exposed to high temperatures from products of the combustion reaction in the combustor. Such shrouds sometimes include blade track components made from ceramic matrix composite (CMC) materials designed to withstand high temperatures. In some examples, coupling ceramic matrix composite components with traditional arrangements and using conventional cooling methods may present problems due to thermal expansion and/or material properties of the ceramic matrix composite components.

SUMMARY

The present disclosure may comprise one or more of the following features and combinations thereof.

A turbine shroud assembly may be adapted for use with a gas turbine engine. The turbine shroud assembly may comprise a blade track segment.

In some embodiments, the blade track segment may be made of ceramic matrix composite materials. The blade track segment may have a shroud wall that extends circumferentially partway around an axis. The blade track segment may have an attachment flange that extends radially outward from the shroud wall away from the axis, In some embodiments, the turbine shroud assembly may include a pin that extends parallel to the axis into a metallic support structure. The pin may extend through an aperture in the attachment flange of the blade track segment. The pin may couple the blade track segment to the metallic support structure.

In some embodiments, the turbine shroud assembly includes a cooling passageway formed in the metallic support structure. The cooling passageway may be shaped to direct cooling air onto a preselected cooling area of the attachment flange included in the blade track segment In some embodiments, the preselected cooling area may be located radially between the shroud wall and the pin. The preselected cooling area may be circumferentially aligned with the pin so that heat absorbed by the shroud wall during use of the turbine shroud assembly is dissipated by the cooling air directed onto the preselected cooling area before being conducted to the pin so as to manage pin-deformation and pin-life.

In some embodiments, the preselected cooling area may be disposed at least partially on an axially forward facing surface of the attachment flange. In some embodiments, the preselected cooling area may be disposed at least partially on an axially aft facing surface of the attachment flange.

In some embodiments, the aperture is a first aperture and the attachment flange may further comprise a second aperture. The second aperture may be spaced circumferentially from the first aperture. A respective preselected cooling area may be disposed radially inward of each one of the first aperture and the second aperture.

In some embodiments, the metallic support structure includes a cooling air plenum. The cooling passageway may be in fluid communication with the cooling air plenum to conduct the cooling air through a wall of metallic support structure to the preselected cooling area.

In some embodiments, the attachment flange is a first attachment flange and the blade track segment further comprise a second attachment flange. The second attachment flange may extend radially outward from the shroud wall. The second attachment flange may be spaced apart axially from the first attachment flange.

In some embodiments, the metallic support structure may include a first intermediate support wall that extends radially inward from an outer wall of the metallic support structure axially aft of the first attachment flange. In some embodiments, the metallic support structure may include a second intermediate support wall that extends radially inward from the outer wall of the metallic support structure axially forward of the second attachment flange and spaced apart axially from the first intermediate support wall to define a chamber.

In some embodiments, the metallic support structure may include a forward support wall axially forward of the first attachment flange so that the first attachment flange is located axially between the forward support wall and the first intermediate support wall. The cooling passageway may include a cooling-area passageway extending axially and radially through the metallic support structure at least partially axially forward of the forward support wall to conduct the cooling air from the cooling air plenum to the preselected cooling area.

In some embodiments, at least a portion of the cooling-area passageway may extend both axially and circumferentially though the metallic support structure. A portion of the cooling-area passageway may extend radially through the metallic support structure.

In some embodiments, the cooling passageway may include a radial passageway extending radially through the metallic support structure to conduct the cooling air from the cooling air plenum to the chamber. The cooling passageway may include a cooling-area passageway extending axially through the metallic support structure to conduct the cooling air from the plenum to at least one of the preselected cooling areas.

In some embodiments, the cooling-area passageway includes a forward cooling-area passageway and an aft cooling-area passageway. The forward cooling-area passageway may extend through the metallic support structure aft of the first attachment flange. The aft cooling-area passageway may extend through the metallic support structure forward of the second attachment flange.

In some embodiments, the cooling-area passageway may extend circumferentially at an angle relative to a circumferentially extending surface of the shroud wall. In some embodiments, the cooling-area passageway may extend axially at an angle relative to the shroud wall of the blade track segment.

In some embodiments, the aperture is a first aperture and the attachment flange may comprising a second aperture spaced circumferentially from the first aperture. The cooling passageway may include a first passageway at least partially circumferentially aligned adjacent to the first aperture and a second passageway spaced apart circumferentially from the first passageway and at least partially circumferentially aligned adjacent to the second aperture.

In some embodiments, the pin includes a first pin and a second pin that each extend axially into the metallic support structure and through the attachment flange of the blade track segment. The first pin may extend through the first aperture and the second pin may extend through the second aperture. The first passageway may be configured to direct the cooling air towards a respective preselected cooling area disposed near the first pin and the first aperture. The second passageway may be configured to direct the cooling air towards a respective preselected cooling area disposed near the second pin and the second aperture.

In some embodiments, the attachment flange is a first attachment flange and the blade track segment may further comprise a second attachment flange. The second attachment flange may extend radially outward from the shroud wall. The second attachment flange may be spaced apart axially from the first attachment flange.

In some embodiments, the metallic support structure includes a first intermediate support wall that extends radially inward from an outer wall of the metallic support structure axially aft of the first attachment flange and a second intermediate support wall that extends radially inward from the outer wall of the metallic support structure axially forward of the second attachment flange. In some embodiments, the first passageway and the second passageway may each include a forward cooling-area passageway and an aft cooling-area passageway. Each of the forward cooling-area passageways may extend through the metallic support structure at least partially forward of the first intermediate support wall aft of the first attachment flange. Each of the aft cooling-area passageways may extend through the metallic support structure at least partially aft of the second intermediate support wall aft of the first intermediate support wall and forward of the second attachment flange.

In some embodiments, a respective angle of each of the forward cooling-area passageways and each of the aft cooling-area passageway with respect to the shroud wall is angled to direct the cooling air at a respective preselected cooling area. In some embodiments, a respective angle of each of the forward cooling-area passageways and each of the aft cooling-area passageway with respect to an axially extending plane perpendicular to the shroud wall is angled to direct the cooling air at a respective preselected cooling area.

According to another aspect of the present disclosure, the turbine shroud assembly may be adapted for use with a gas turbine engine. The turbine shroud assembly may comprise a blade track segment made of ceramic matrix composite materials. The blade track segment may have a shroud wall that extends circumferentially partway around an axis and an attachment flange that extends radially outward from the shroud wall away from the axis.

In some embodiments, the blade track segment may include a pin that extends parallel to the axis into a metallic support structure and through an aperture in the attachment flange of the blade track segment. The pin may couple the blade track segment to the metallic support structure. The blade track segment may include a cooling passageway formed in the metallic support structure. The cooling passageway may be shaped to direct cooling air onto a preselected cooling area located radially between the shroud wall and the pin. The cooling passageway may be circumferentially aligned with the pin.

In some embodiments, the attachment flange is a first attachment flange and the blade track segment may further comprise a second attachment flange that extends radially outward from the shroud wall. The second attachment flange may be spaced apart axially from the first attachment flange.

In some embodiments, the metallic support structure may include a first intermediate support wall that extends radially inward from an outer wall of the metallic support structure axially aft of the first attachment flange. The metallic support structure may include a second intermediate support wall that extends radially inward from the outer wall of the metallic support structure axially forward of the second attachment flange and spaced apart axially from the first intermediate support wall to define a chamber.

In some embodiments, the metallic support structure may include a forward support wall axially forward of the first attachment flange so that the first attachment flange is located axially between the forward support wall and the first intermediate support wall. The cooling passageway may include a cooling-area passageway extending axially and radially through the forward support wall to conduct the cooling air from the cooling air plenum to the preselected cooling area.

In some embodiments, at least a portion of the cooling-area passageway may extend radially, axially, and circumferentially though the metallic support structure. In some embodiments, the cooling-area passageway may include a forward cooling-area passageway and an aft cooling-area passageway. The forward cooling-area passageway may extend through the metallic support structure at least partially forward of the first intermediate support wall aft of the first attachment flange. The aft cooling-area passageway may extend through the metallic support structure at least partially aft of the second intermediate support wall aft of the first intermediate support wall and forward of the second attachment flange.

According to another aspect of the present disclosure, a method may comprise providing a blade track segment including a shroud wall. The shroud wall may be shaped to extend partway around an axis and an attachment flange that that extends radially outward from the shroud wall.

In some embodiments, the method may include providing a pin that extends axially though a metallic support structure and through an aperture in the attachment flange of the blade track segment so as to couple the blade track segment to the metallic support structure. In some embodiments, the method may include arranging the blade track segment adjacent to the metallic support structure. In some embodiments, the method may include inserting the pin through a wall of the metallic support structure and the aperture of the attachment flange to couple the blade track segment to the metallic support structure.

In some embodiments, the method may include conducting a flow of cooling air through a passageway formed in the metallic support structure. In some embodiments, the method may include directing the flow of cooling air towards a preselected area disposed on the blade track segment on a portion of the attachment flange between the aperture and the shroud wall. The preselected area may be adjacent to where the pin extends through the aperture of the attachment flange to avoid localized high thermal gradient areas on the blade track segment.

These and other features of the present disclosure will become more apparent from the following description of the illustrative embodiments.

BRIEF DESCRIPTION OF THE DRAWINGS

FIG. 8 is a cross-sectional view of the turbine shroud assembly of FIG. 4 taken along line 8-8 showing that the carrier segment includes an outer wall, forward and aft support walls that each extend radially inward from the outer wall axially forward and aft of the attachment feature, and first and second intermediate support walls that each extend radially inward from the outer wall of axially between the forward and aft support walls, and further showing the cooling-area passageways extending through the carrier segment to direct cooling air from the plenum to the preselected cooling areas on the aft surface of the forward attachment flange and on the forward surface of the aft attachment flange of the blade track segment to avoid localized high thermal gradient areas on the shroud wall of the blade track segment;

DETAILED DESCRIPTION OF THE DRAWINGS

For the purposes of promoting an understanding of the principles of the disclosure, reference will now be made to a number of illustrative embodiments illustrated in the drawings and specific language will be used to describe the same.

Figures 1, 2, 3:
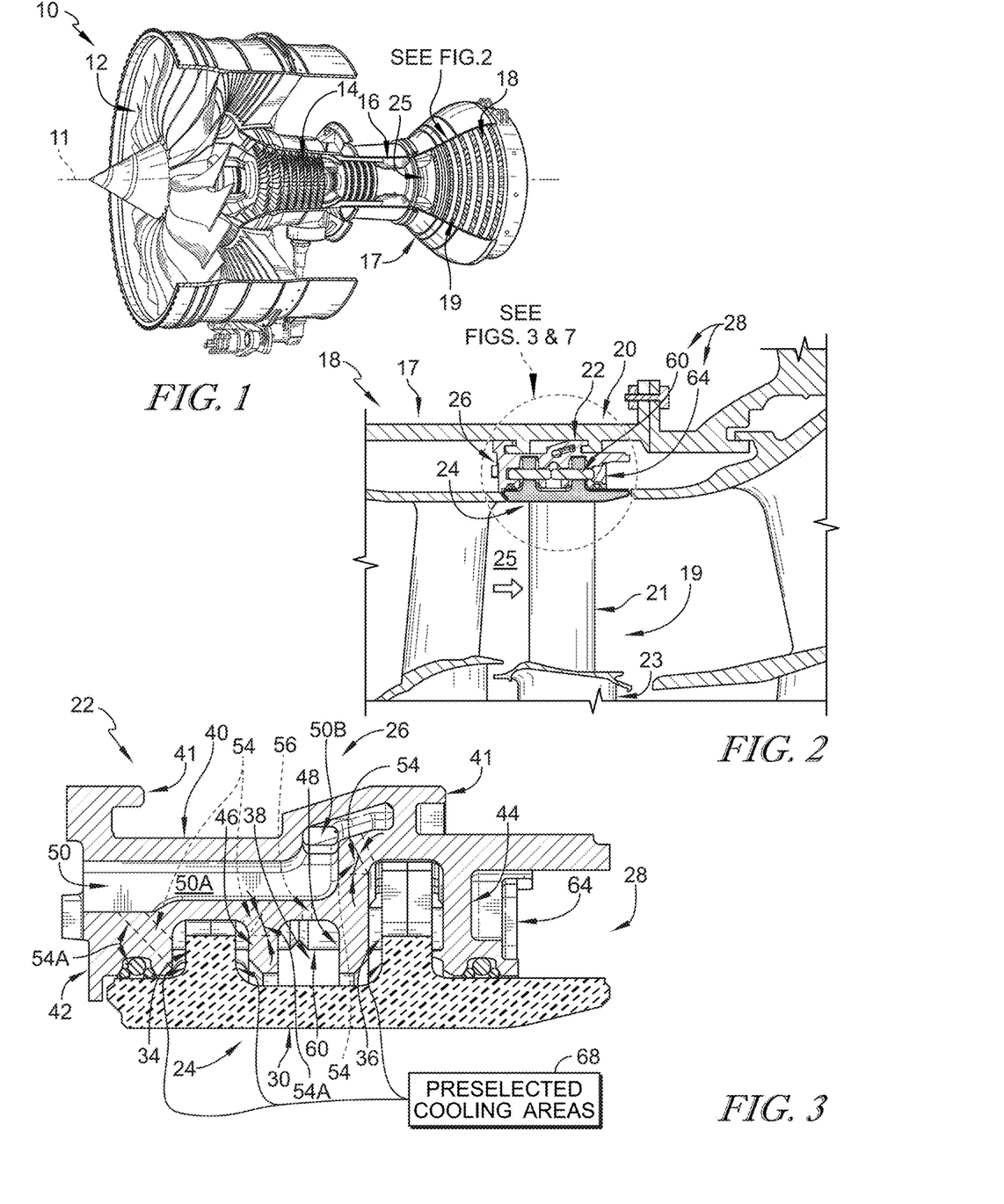
FIG. 1 is a cut-away perspective view of a gas turbine engine showing that the exemplary engine includes a fan, a compressor, a combustor, and a turbine and suggesting that the turbine includes turbine wheel assemblies and static vane assemblies surrounded by a turbine shroud assembly.
FIG. 2 is a partial cross-sectional view of the gas turbine engine of FIG. 1 showing a portion of the turbine in which the turbine shroud assembly is located radially outward from blades of a turbine wheel assembly to block gasses from passing over the blades without interacting with the blades.
FIG. 3 is a cross-sectional view of the turbine shroud assembly of FIG. 2 showing the carrier segment is formed to define a cooling air plenum, a chamber is defined between the outer wall and the intermediate support walls, and cooling passageways, including radial passageways and cooling-area passageways, to direct cooling air from the plenum to preselected cooling areas on attachment flanges of the blade track assembly to avoid localized high thermal gradient areas on the shroud wall of the blade track segment.
Figure 4:
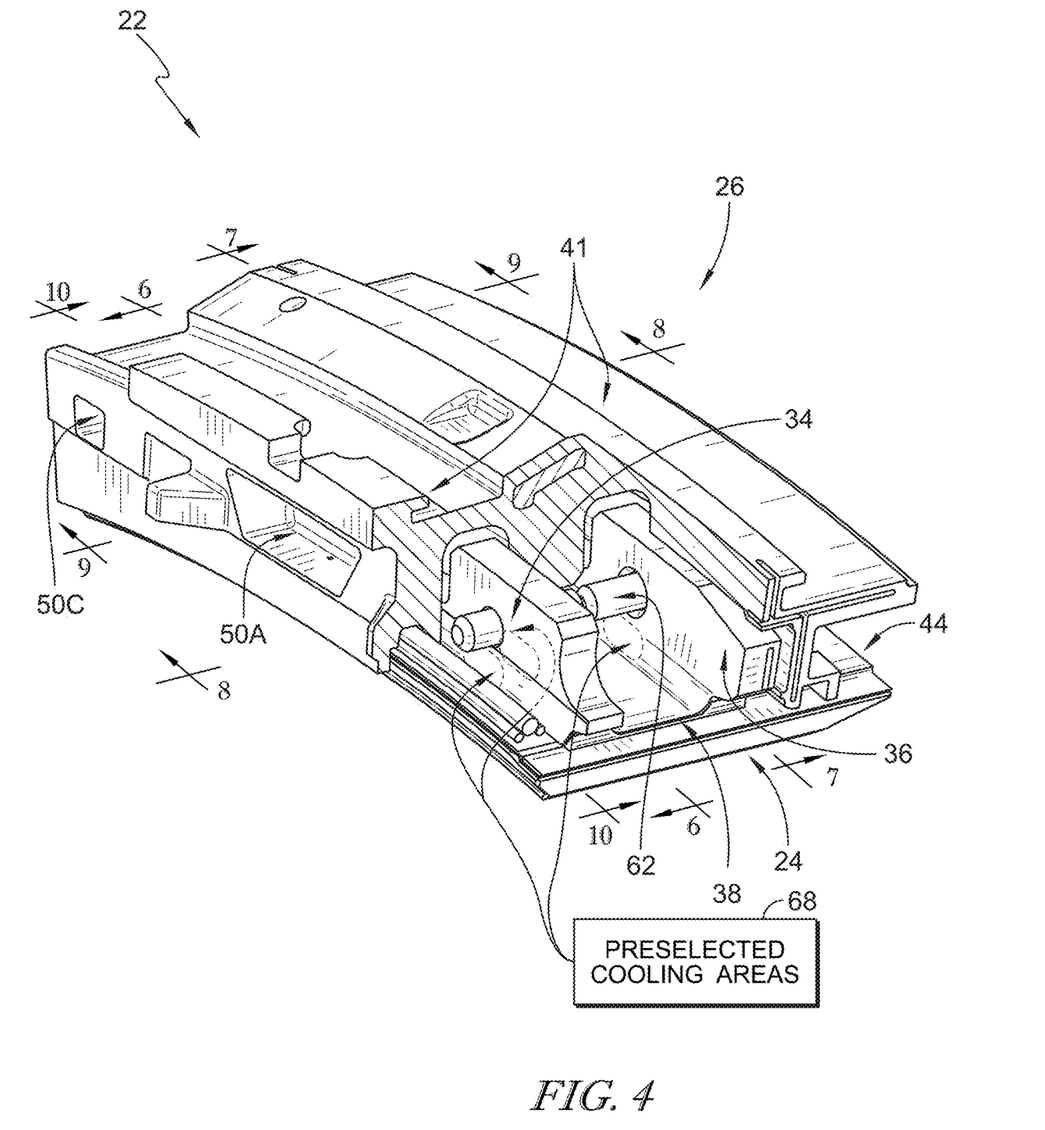
FIG. 4 is a perspective, partial cut away view of a portion of the turbine shroud assembly of FIGS. 2 and 3 showing the turbine shroud assembly includes the carrier segment and the blade track segment made from ceramic matrix composite materials coupled to the carrier segment, and further showing the preselected cooling areas cooled by the cooling passageways to avoid localized high thermal gradient areas on the shroud wall of the blade track segment, the preselected cooling areas located on forward and aft attachment flanges of the blade track segment located radially inward or below apertures in the blade track segment that the pins extend through to couple the blade track segment to the carrier segment.

A turbine shroud assembly 22 is shown in FIGS. 2-7 and is adapted for use in a gas turbine engine 10 as shown in FIG. 1. The turbine shroud assembly 22 includes a blade track segment 24 arranged circumferentially at least partway around an axis 11 of the gas turbine engine 10, a carrier segment 26 arranged circumferentially at least partway around the axis 11, and a mount system 28 configured to couple the blade track segment 24 to the carrier segment 26 as shown in FIGS. 2-7.

The blade track segment 24 is a ceramic matrix composite component configured to directly face the high temperatures of a gas path 25 of the gas turbine engine 10 to define a portion of the gas path 25. The carrier segment 26 is a metallic support component configured to interface with other metallic components of the gas turbine engine 10, such as the case 17, to support the blade track segment 24 to radially locate the blade track segment 24 relative to the axis 11. The mount system 28 includes at least one pin, and illustratively the mount system 28 includes two pins 60, 62 that each extend axially through apertures 60H, 62H in the blade track segment 24, into the blade track segment 24 and the carrier segment 26 to couple the blade track segment 24 to the carrier segment 26.

During operation of the gas turbine engine 10, the hot, high-pressure products directed into the turbine 18 from the combustor 16 flow across a shroud wall 30 of the blade track segment 24 that defines a portion of the gas path 25. The hot gases flowing across the shroud wall 30 heat the blade track segment 24, which may transfer heat to the pins 60, 62 that couple the blade track segment 24 to the carrier segment 26. The pins 60, 62 are made of metallic materials in the illustrative embodiment. The added heat may challenge the life of the pins 60, 62.

The carrier segment 26 includes cooling passageways 52 to conduct cooling air through the carrier segment 26 to the blade track segment 24, to cool the blade track segment 24. In illustrative embodiments, as shown in FIGS. 3-11, the cooling passageways 52 conduct cooling air through the carrier segment 26 to preselected cooling areas 68 on the blade track segment 24. The preselected cooling areas 68 are illustratively located radially inward or below apertures 60H, 62H defined by the blade track segment 24. The preselected cooling areas 68 are illustratively located between the apertures 60H, 62H and a radially outward-facing surface of the shroud wall 30 of the blade track segment 24.

The preselected cooling areas 68 are located near and in close proximity to the apertures 60H, 62H through which pins 60, 62 extend so that heat absorbed by the shroud wall 30 during use of the turbine shroud assembly 22 is dissipated by direct impingement cooling air on the preselected cooling areas 68 before being conducted to the pins 60, 62. In illustrative embodiments, the preselected cooling areas 68 extend radially between a radially inward most point of a respective aperture 60H, 62H and the axially extending portion of the shroud wall 30, for example, the preselected cooling areas 68 may include the area of the attachment flange 34, 36 between the shroud wall 30 and a respective aperture 60H, 62H. In illustrative embodiments, the preselected cooling areas 68 include a portion of a respective aperture 60H, 62H, portion of the shroud wall 30, and/or portions of the attachment flange 34, 36 disposed forward and/or aft of the aperture 60H, 62H.

As will be described in more detail below, the cooling passageways 52 illustratively include cooling-area passageways 54 and radial passageways 56. In illustrative embodiments, as shown in FIGS. 3-11, the radial passageways 56 may extend radially relative to the blade track segment 24 to direct cooling air from a plenum 50 defined by the carrier segment 26 to a chamber 38 defined between the carrier segment 26 and the blade track segment 24. In illustrative embodiments, as shown in FIGS. 3-11, the cooling-area passageways 54 may extend through radially through the carrier segment 26 to direct cooling air from the plenum 50 to the preselected cooling areas 68. The cooling-area passageways 54 may extend through the carrier segment 26 radially, axially, and/or circumferentially relative to the blade track segment 24.

The cooling passageways 52 may create localized high thermal gradient areas or localized cold areas on the shroud wall 30 of the blade track segment 24. Therefore, the carrier segment 26 of the present disclosure is formed to include a cooling air plenum 50 and a plurality of cooling passageways 52. The radial passageways 56 are in fluid communication with the cooling air plenum 50 to conduct cooling air through the carrier segment 26 into a chamber 38 defined radially between the carrier segment 26 and the blade track segment 24. In illustrative embodiments, the radial passageways 56 are disposed at a circumferential angle with respect to the inner surface of the carrier segment 26 and angled to allow the air to diffuse and swirl in the chamber 38. In illustrative embodiments, the radial passageways 56 are disposed at a radial and/or axially angle.

In illustrative embodiments, the radial passageways 56 extend radially through an outer wall 40 of the carrier segment 26 to allow the cooling air to move circumferentially into an open space of the chamber 38 and diffuse before contacting the shroud wall 30 to avoid creating localized high thermal gradient areas on the shroud wall 30 of the blade track segment 24.

As shown in FIGS. 2-11, the cooling-area passageways 54 extend circumferentially and radially at an angle 54C relative to a circumferentially extending surface of the shroud wall 30 such that an inlet at one end of a cooling-area passageway 54 is offset in the radial and circumferential direction from an outlet at the opposite end of the cooling-area passageway 54. The outlet of a cooling-area passageway 54 is located closer to the nearest preselected cooling area 68 in the radial and circumferential direction than the corresponding inlet of the same cooling-area passageway 54. For example, the inlet of a cooling-area passageway 54 is located radially inward and closer to the nearest preselected cooling area 68 than the corresponding outlet of the cooling-area passageway 54.

Figure 7:
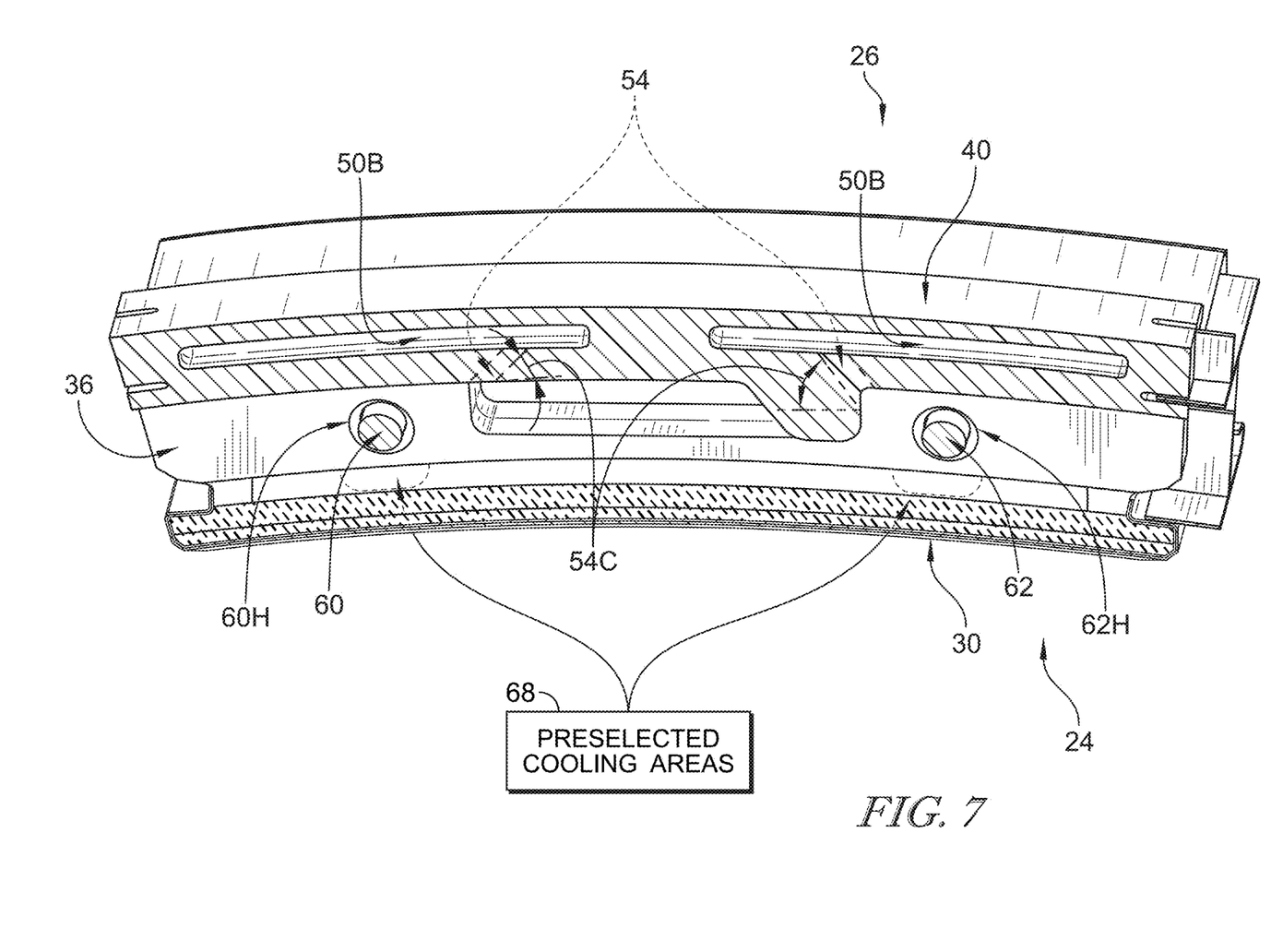
FIG. 7 is a cross-sectional view of the turbine shroud assembly of FIG. 4 taken along line 7-7 showing cooling-area passageways of the cooling passageways extending radially through the carrier segment to direct the cooling to the preselected cooling areas on a forward surface of an aft attachment flange of the blade track segment.
Figure 9:
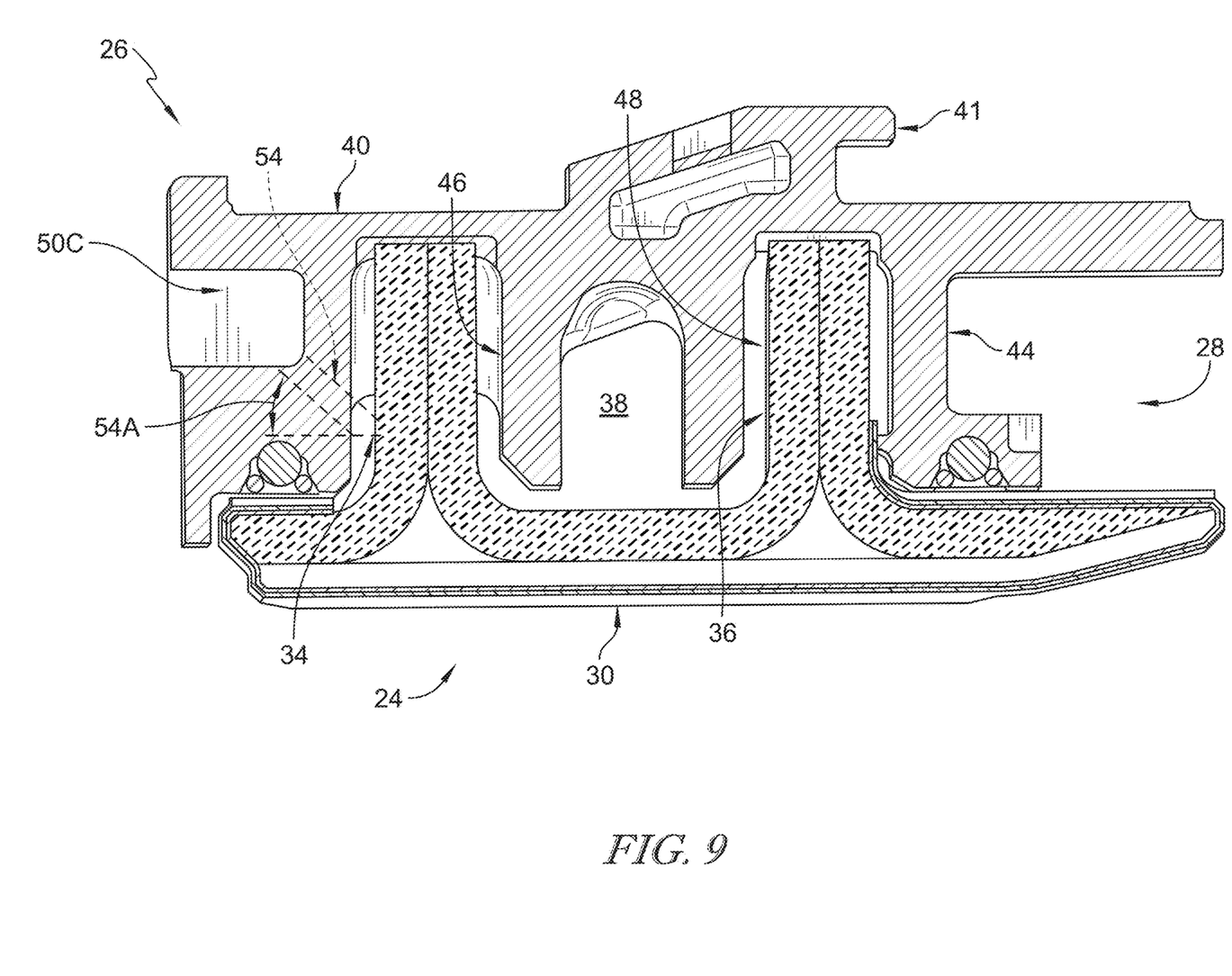
FIG. 9 is a cross-sectional view of the turbine shroud assembly of FIG. 4 taken along line 9-9 showing the cooling-area passageways extending through the forward support wall of the carrier segment to direct cooling air from the plenum to the preselected cooling areas on a forward surface of the forward attachment flange of the blade track segment to avoid localized high thermal gradient areas on the shroud wall of the blade track segment.

As shown at least in FIGS. 3, 7, and 9, the cooling-area passageways 54 extend axially at an angle 54A relative to relative to axis 11, such that an inlet at one end of a cooling-area passageway 54 is offset in the axial direction from an outlet at the opposite end of the cooling-area passageway 54. The outlet of a cooling-area passageway 54 is located closer to a preselected cooling area 68 that the corresponding inlet of the same cooling-area passageway 54. For example, the inlet of a cooling-area passageway 54 is located axially closer to the nearest preselected cooling area 68, in the forward or aft direction, than the corresponding outlet of the cooling-area passageway 54.

Figure 6:
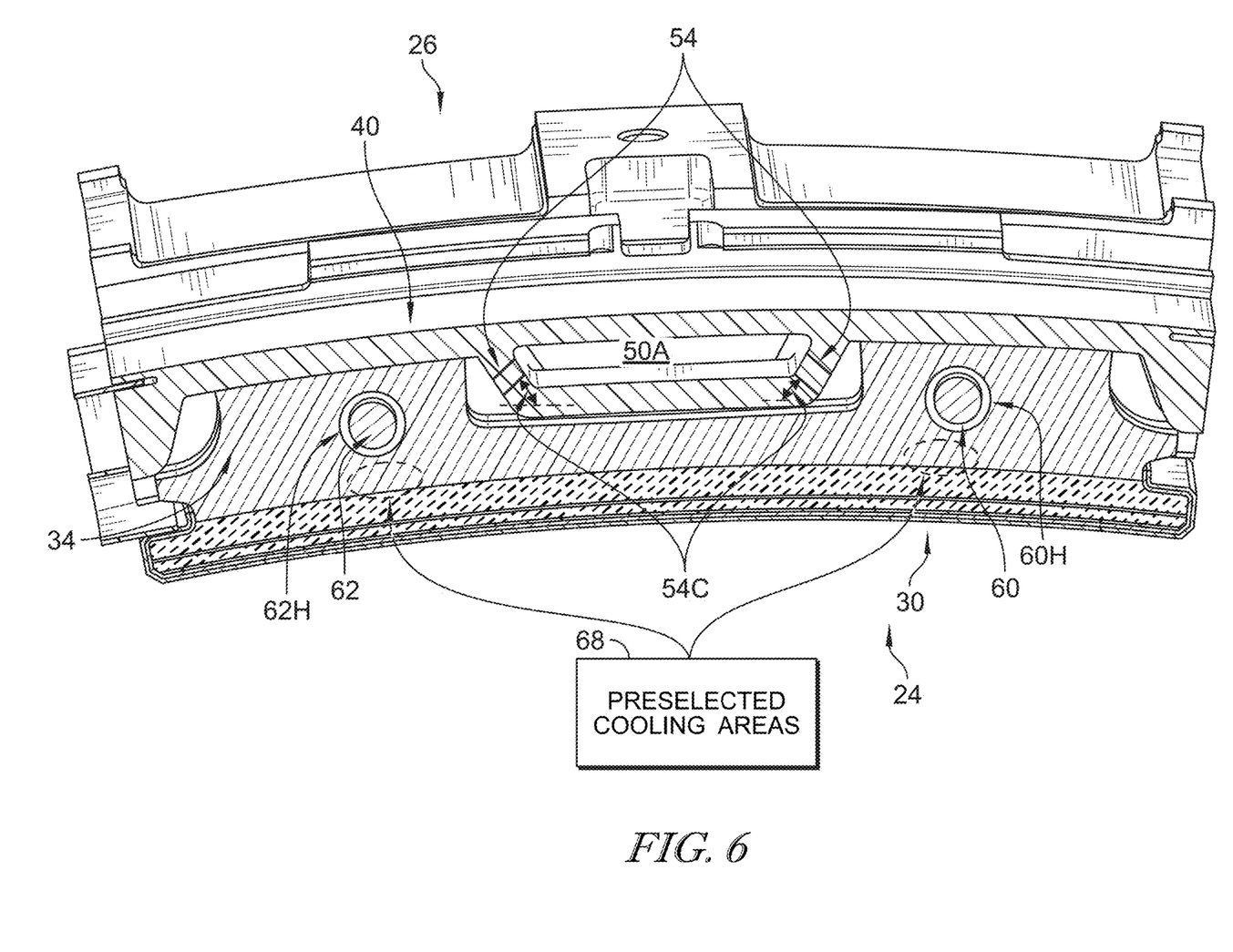
FIG. 6 is a cross-sectional view of the turbine shroud assembly of FIG. 4 taken along line 6-6 showing cooling-area passageways of the cooling passageways extending radially through the carrier segment to direct the cooling to the preselected cooling areas on an aft surface of a forward attachment flange of the blade track segment.
Figure 10:
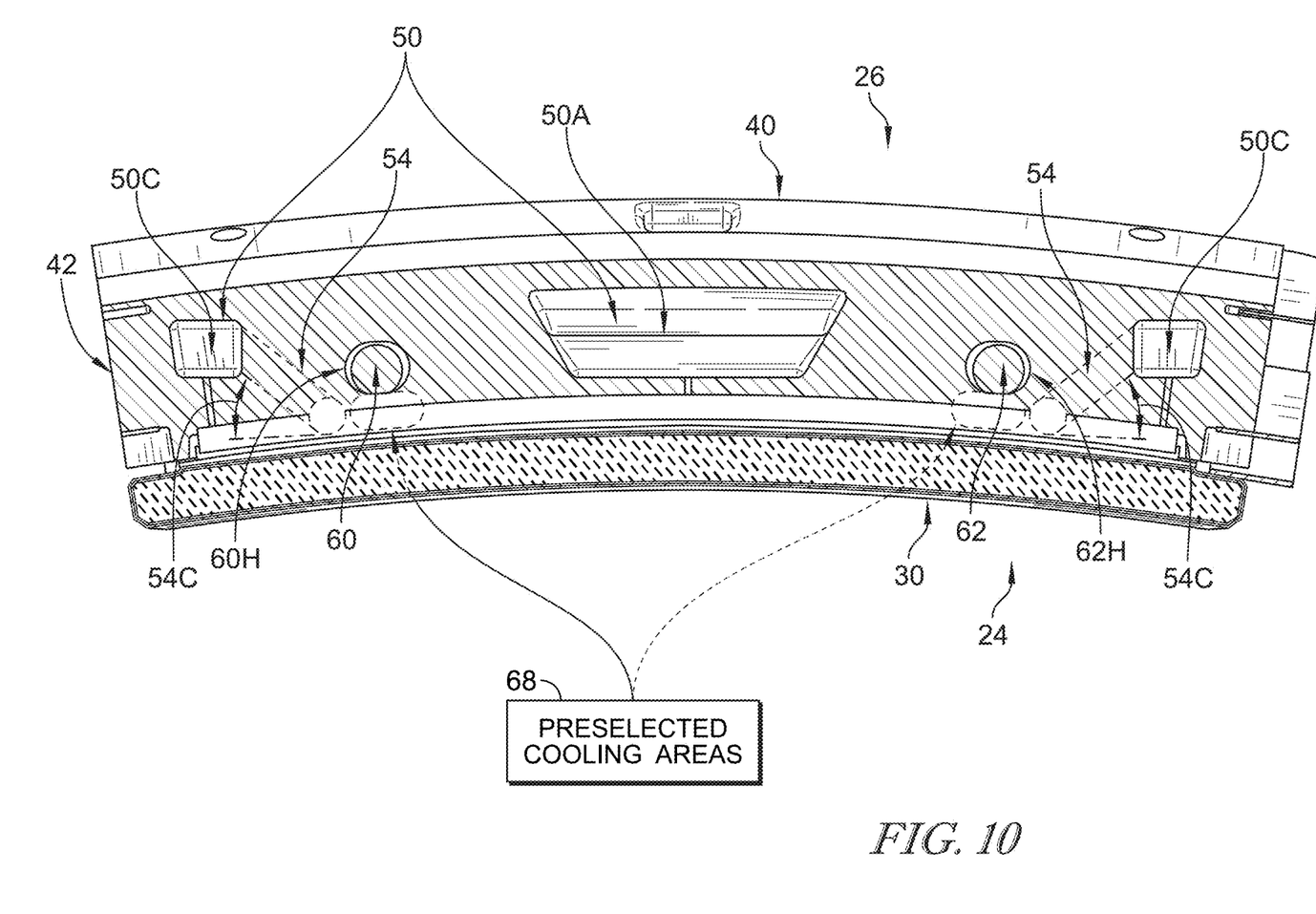
FIG. 10 is a cross-sectional view of the turbine shroud assembly of FIG. 4 taken along line 10-10 showing cooling-area passageways of the cooling passageways extending radially through the carrier segment to direct the cooling to the preselected cooling areas on the forward surface of the forward attachment flange of the blade track segment.

As shown in FIGS. 6-10, the circumferential angle 54C of each cooling-area passageway 54 is approximately 45 degrees, and the axial angle 54A of each cooling-area passageway 54 is approximately 45 degrees. As shown in FIGS. 6, 7, and 10, the circumferential angle 56C of each radial passageway 56 is approximately 90 degrees. In illustrative embodiments the angles 54A, 54C of the cooling-area passageways 54 may be larger or smaller than 45 degrees, for example, in the range between about 20 degrees and about 160 degrees.

In the illustrative embodiments, the angles 54A, 54C, of each of the cooling-area passageways 54 is the same. In some embodiments, one or more of the angles 54A, 54C of at least one cooling-are passageway 54 of the plurality of is different than one or more of the angles 54A, 54C of the other cooling-area passageways 54.

As discussed in more detail below, the cooling-area passageways and the radial passageways 56 are formed to direct the cooling air from the plenum 50 to each of the preselected cooling areas 68, located radially inward of the apertures 60H, 62H, between the apertures 60H, 62H and the shroud wall 30. The directed cooling air dissipates heat, via direct impingement cooling, absorbed by the shroud wall 30 during use of turbine shroud assembly before the heat is conducted to the pins 60, 62. At least in this way, the cooling air directed to the preselected cooling areas 68 manages, mitigates, and reduces deformation of the pin 60, 62 and extends the life of the pin 60, 62.

In some designs incorporating CMC materials, directing cooling air in ways that may exacerbate stress and/or reduce the life of CMC components are avoided. For example, some CMC designs may choose to increase the diameter of the pin and/or move the location of the pin farther away from the shroud wall to extend the life of the pin and mitigate damage to the pin from heat absorbed by the shroud wall during use of the turbine shroud assembly. Some designs may choose to change the size and/or location of the pin instead of forming cooling passageways for cooling air with the assembly and directing cooling air to a location between the pin and the shroud wall, which may create localized high thermal gradient areas or otherwise place additional stress on the CMC blade track segment and/or shroud wall.

With the cooling passageways 52 of the present disclosure initially described above, the gas turbine engine 10 is now described in more detail. The gas turbine engine 10 includes a fan 12, a compressor 14, a combustor 16, and a turbine 18 as shown in FIG. 1. The fan 12 is driven by the turbine 18 and provides thrust for propelling an air vehicle. The compressor 14 compresses and delivers air to the combustor 16. The combustor 16 mixes fuel with the compressed air received from the compressor 14 and ignites the fuel. The hot, high-pressure products of the combustion reaction in the combustor 16 are directed into the turbine 18 to cause the turbine 18 to rotate about an axis 11 and drive the compressor 14 and the fan 12. In some embodiments, the fan may be replaced with a propeller, drive shaft, or other suitable configuration.

The turbine 18 includes at least one turbine wheel assembly 19 and a turbine shroud 20 positioned to surround the turbine wheel assembly 19 as shown in FIGS. 1 and 2. The turbine wheel assembly 19 includes a plurality of blades 21 coupled to a rotor disk 23 for rotation with the disk 23. The hot, high pressure combustion products from the combustor 16 are directed toward the blades 21 of the turbine wheel assemblies 19 along the gas path 25. The turbine shroud 20 is coupled to the outer case 17 of the gas turbine engine 10 and extends around the turbine wheel assembly 19 to block gases from passing over the turbine blades 21 during use of the turbine 18 in the gas turbine engine 10.

In the illustrative embodiment, the turbine shroud 20 is made up of a number of turbine shroud assemblies 22 that each extend circumferentially partway around the axis 11 and cooperate to surround the turbine wheel assembly 19. In other embodiments, the turbine shroud 20 is annular and non-segmented to extend fully around the axis 11 and surround the turbine wheel assembly 19. In yet other embodiments, certain components of the turbine shroud 20 are segmented while other components are annular and non-segmented.

Each turbine shroud assembly 22 includes the blade track segment 24, the carrier segment 26, and the mount system 28 as shown in FIGS. 2-11. The blade track segment 24 and the carrier segment 26 are arranged circumferentially partway about the axis 11. The mount system 28 is configured to couple the blade track segment 24 to the carrier segment 26.

The blade track segment 24 includes the shroud wall 30 and an attachment feature 32 as shown in FIGS. 4-11. The shroud wall 30 that extends circumferentially partway around the axis 11. The attachment feature 32 includes a first attachment flange 34, or forward attachment flange 34, and a second attachment flange 36, or aft attachment flange 36, that each extend radially outward from the shroud wall. The second attachment flange 36 is spaced apart axially from the first attachment flange 34, the first attachment flange 34 disposed axially forward of the second attachment flange 36 with respect to the direction of flow of gas through the engine 10 during operation of the engine 10.

The carrier segment includes an outer wall 40, a pair of hangers 41, a forward support wall 42, and an aft support wall 44 as shown at least in FIGS. 3-5, 8, and 9. The outer wall 40 extends circumferentially at least partway about the axis 11. The hangers 41 extend radially outward from the outer wall 40 and engage the case 17 to couple the turbine shroud assembly 22 to the rest of the engine 10.

The forward support wall 42 extends radially inward from the outer wall 40 axially forward of the first attachment flange 34. The aft support wall 44 extends radially inward from the outer wall 40 axially aft of the second attachment flange 36. The outer wall 40 of the carrier segment 26 is spaced radially outward of the attachment feature 32 of the blade track segment 24 to define a chamber 38 radially between the carrier segment 26 and the blade track segment 24.

The outer wall 40 of the carrier segment 26 is formed to include the cooling air plenum 50 and the cooling passageways 52 in fluid communication with the cooling air plenum 50 and the chamber 38 to conduct cooling air through the carrier segment 26 into the chamber 38 formed between the carrier segment 26 and the blade track segment 24. The cooling passageways 52 extend through the outer wall 40 of the carrier segment 26 and to move circumferentially into an open space of the chamber 38.

In the illustrative embodiment, the carrier segment 26 further includes a first intermediate support wall 46 and a second intermediate support wall 48 as shown at least in FIGS. 3-5, 8, and 9. The first intermediate support wall 46 and the second intermediate support wall 48 each extend radially inward from the outer wall 40 of the carrier segment 26.

The first intermediate support wall 46 extends radially inward from the outer wall 40 axially aft of the first attachment flange 34 of the blade track segment 24 so that the first attachment flange 34 is located in a forward space between the forward support wall 42 and the first intermediate support wall 46. The second intermediate support wall 48 extends radially inward from the outer wall axially forward of the second attachment flange 36 of the blade track segment 24 so that the second attachment flange 36 is located in an aft space between the aft support wall 44 and the second intermediate support wall 48.

The second intermediate support wall 48 is spaced apart axially from the first intermediate support wall 46 to define the open space of the chamber 38. In the illustrative embodiment, the open space of the chamber 38 is defined between the first and second intermediate support walls 46, 48, the outer wall 40 of the carrier segment 26, and the shroud wall 30 of the blade track segment.

The radial passageways 56 extend through the outer wall 40 axially between the first and second intermediate support walls 46, 48 to fluidly connect the cooling air plenum 50 to the chamber 38 and to conduct cooling air through the carrier segment 26 into the chamber 38. In illustrative embodiments, as shown at least in FIGS. 3, 8, and 9, the radial passageways 56 extend radially at a 90 degree angle relative to an inner surface of the carrier segment 26. In illustrative embodiments, the radial passageways 56 could extend radially, axially, and/or circumferentially at an angle to direct the cooling air from the cooling air plenum 50 to the chamber 38 at a particular angle or to a particular spot or location. The radial passageways 56 are disposed circumferentially along the carrier segment 26 between the plenum 50A and the chamber 38. In illustrative embodiments, the radial passageways 56 are disposed at certain intervals along the carrier segment 26.

In illustrative embodiments, as shown in FIGS. 9 and 10, some of the cooling-area passageways 54 extend through the forward support wall 42 to conduct cooling air through the carrier segment 26, from the plenum 50C, and to the preselected cooling areas 68 on a forward-facing surface of the forward attachment flange 34. The cooling-area passageway 54 may extend through the forward support wall 42 radially, axially, and/or circumferentially such that an outlet of the cooling-area passageway 54 near the preselected cooling area 68 is offset from an inlet of the cooling-area passageway 54 in the radial, axial, and/or circumferential direction. For example, in illustrative embodiments as shown in FIGS. 6-10, the outlet of the cooling-area passageway 54 is radially inward and closer to the preselected cooling area 68 in the radial and circumferential directions than the inlet of the cooling-area passageway 54 disposed in the plenum 50.

Figure 8:
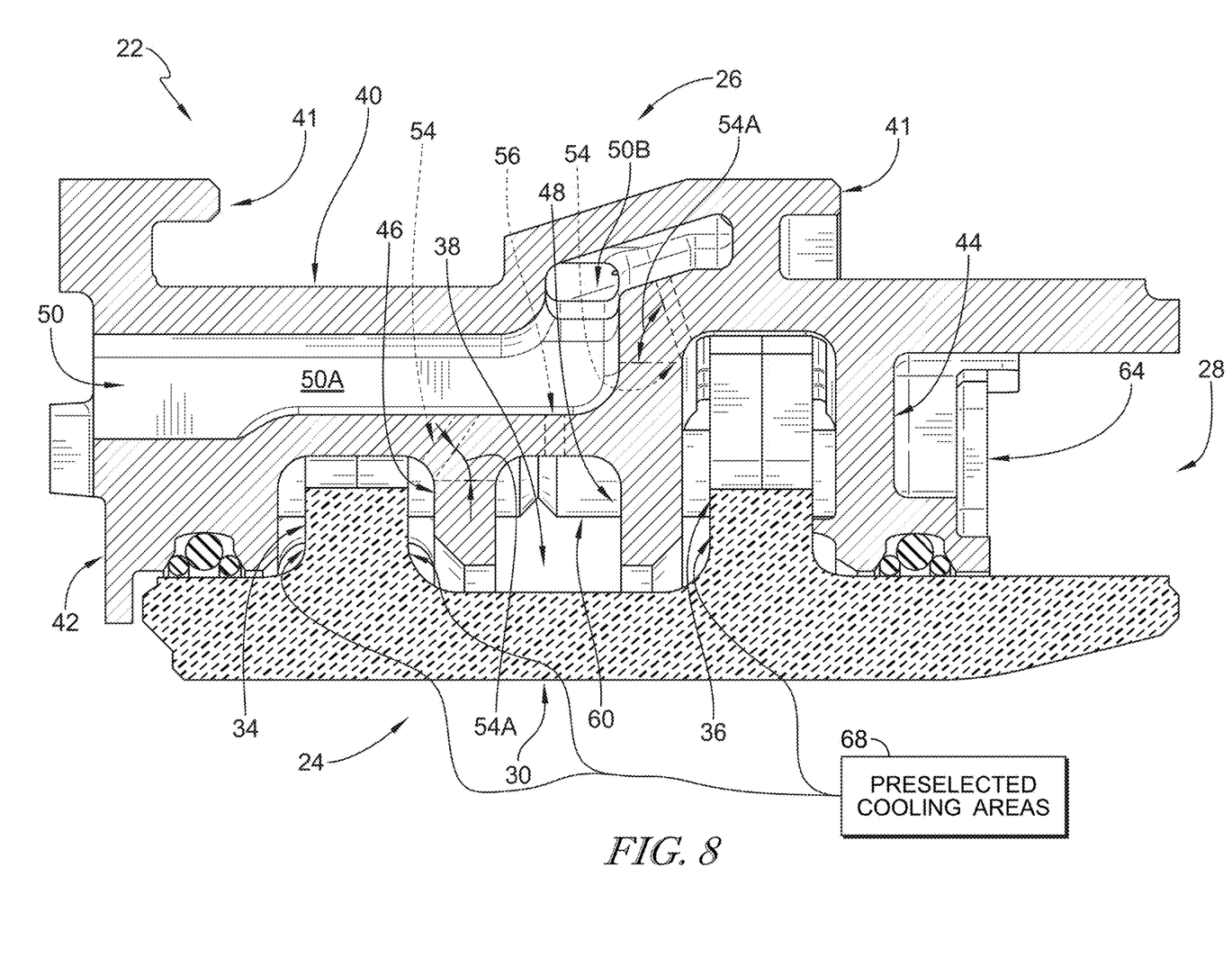

In illustrative embodiments, as shown in FIGS. 6 and 8, some of the cooling-area passageways 54 extend through the carrier segment 26 near or at least partially axially forward of the first intermediate support wall 46 to conduct cooling air through the carrier segment 26, from the plenum 50A, and to the preselected cooling areas 68 on an aft surface of the forward attachment flange 34. In illustrative embodiments, as shown in FIGS. 7 and 8, some of the cooling-area passageways 54 extend through the carrier segment near or at least partially axially aft of the second intermediate support wall 48 to conduct cooling air through the carrier segment 26, from the plenum 50B, to the preselected cooling areas 68 on a forward surface of the aft attachment flange 36. The cooling-area passageway 54 may extend through the carrier segment 26 radially, axially, and/or circumferentially such that a respective outlet of the cooling-area passageway 54 near a respective preselected cooling areas 68 on one of the attachment flanges 34, 36 is offset from a respective inlet of the cooling-area passageway 54 in the radial, axial, and/or circumferential direction. For example, in illustrative embodiments as shown in FIGS. 3-11, the outlet of the cooling-area passageway 54 is radially inward and closer to the preselected cooling-area 68 in the radial and circumferential directions than the inlet of the cooling-area passageway 54 disposed in the chamber 38.

The cooling-area passageways 54 are disposed circumferentially along the carrier segment 26, for example, through the forward support wall 42 between the plenum 50C and a preselected cooling area 68, through the carrier segment 26 between the plenum 50A and a preselected cooling area 68, or through the carrier segment 26 between the plenum 50B and a preselected cooling area 68. In illustrative embodiments, the cooling-area passageways 54 are disposed at certain intervals along the carrier segment 26.

Each of the cooling passageways 52 extends at an angle 54A, 54C, as described above, between about 20 degrees and about 70 degrees.

In some embodiments, the angle 54A, 54C of each cooling passageway 52 is between about 30 degrees and about 70 degrees. In some embodiments, the angle 54A, 54C of each cooling passageway 52 is between about 40 degrees and about 70 degrees. In some embodiments, the angle 54A, 54C of each cooling passageway 52 is between about 50 degrees and about 70 degrees. In some embodiments, the angle 54A, 54C of each cooling passageway 52 is between about 60 degrees and about 70 degrees.

In some embodiments, the angle 54A, 54C of each cooling passageway 52 is between about 20 degrees and about 60 degrees. In some embodiments, the angle 54A, 54C of each cooling passageway 52 is between about 20 degrees and about 50 degrees. In some embodiments, the angle 54A, 54C of each cooling passageway 52 is between about 20 degrees and about 40 degrees. In some embodiments, the angle 54A, 54C of each cooling passageway 52 is between about 20 degrees and about 30 degrees.

In some embodiments, the angle 54A, 54C of each cooling passageway 52 is between about 30 degrees and about 60 degrees. In some embodiments, the angle 54A, 54C of each cooling passageway 52 is between about 30 degrees and about 50 degrees. In some embodiments, the angle 54A, 54C of each cooling passageway 52 is between about 30 degrees and about 40 degrees. In some embodiments, the angle 54A, 54C of each cooling passageway 52 is between about 40 degrees and about 60 degrees. In some embodiments, the angle 54A, 54C of each cooling passageway 52 is between about 40 degrees and about 50 degrees. In some embodiments, the angle 54A, 54C of each cooling passageway 52 is between about 50 degrees and about 60 degrees.

In some embodiments, the angle 54A, 54C of each cooling passageway 52 is about 20 degrees. In some embodiments, the angle 54A, 54C of each cooling passageway 52 is about 25 degrees. In some embodiments, the angle 54A, 54C of each cooling passageway 52 is about 30 degrees. In some embodiments, the angle 54A, 54C of each cooling passageway 52 is about 35 degrees.

In some embodiments, the angle 54A, 54C of each cooling passageway 52 is about 40 degrees. In some embodiments, the angle 54A, 54C of each cooling passageway 52 is about 45 degrees. In some embodiments, the angle 54A, 54C of each cooling passageway 52 is about 50 degrees. In some embodiments, the angle 54A, 54C of each cooling passageway 52 is about 55 degrees.

In some embodiments, the angle 54A, 54C of each cooling passageway 52 is about 60 degrees. In some embodiments, the angle 54A, 54C of each cooling passageway 52 is about 65 degrees. In some embodiments, the angle 54A, 54C of each cooling passageway 52 is about 70 degrees.

In illustrative embodiments, the cooling passageways 52 and/or additional passageways may be located at least partially axially forward of the intermediate support wall 46 or at least partially aft of the intermediate support wall 48. In other illustrative embodiments, at least some of the cooling passageways 52 are located axially between the first and second intermediate support walls 46. In other illustrative embodiments, the intermediate support walls 46, 48 are omitted and the cooling passageways 52 are located axially between the first and second attachment flanges 34, 36.

In the illustrative embodiment, the cooling air plenum 50 has axially extending sections 50A and 50C and a circumferentially extending section 50B as shown in FIGS. 6-10. The axially extending sections 50A and 50C extend through the forward support wall 42 into the outer wall 40 as shown at least in FIGS. 8 and 9. The circumferentially extending section 50B extends circumferentially at least partway about the axis between the circumferential ends of the carrier segment 26 as shown in FIGS. 7-9.

In the illustrative embodiment, the circumferentially extending section 50B of the cooling air plenum 50 does not extend through the circumferential ends of the carrier segment 26. In other embodiments, the circumferentially extending section 50B of the cooling air plenum 50 may extend through the circumferential ends of the carrier segment 26 so that each cooling air plenum 50 of adjacent turbine shroud segments 22 are in fluid communication with each other.

In some embodiments, the carrier segment 26 may be formed to include multiple radial passageways 56. In some embodiments, the carrier segment 26 may be formed to include a single radial passageways 56 disposed between the cooling-area passageways 54. In some embodiments, the radial passageways 56 are spaced apart circumferentially about the axis 11. Each of the radial passageways 56 opens into the circumferentially extending section 50B of the cooling air plenum 50 and the chamber 38.

In the illustrative embodiment, the cooling-area passageways 54 include a first cooling-area passageway directed to a preselected cooling area 68 near a first pin 60 and a second cooling-area passageway directed a preselected cooling area near a second pin 62 as shown in FIG. 6-10. The cooling-area passageways 54 are spaced apart circumferentially about the axis 11, each angled and located to direct cooling air on a respective preselected cooling area 68.

In illustrative embodiments, the carrier segment 26 is shaped to define at least six cooling-area passageways 54, with at least one cooling-area passageway 54 per each preselected cooling-area 68. In illustrative embodiments, a first and second cooling-area passageway 54 extend through the forward support wall 42 directing cooling air to the preselected cooling areas 68 on the forward surface of the forward attachment flange 34 from the plenum 50. The first cooling-area passageway 54 is circumferentially offset from the second cooling-area passageway, the first cooling-area passageway 54 formed to direct cooling air to the preselected cooling area 68 on the forward surface of the forward attachment flange 34 from the plenum 50 near the pin 60 and the aperture 60H, and the second cooling-area passageway 54 formed to direct cooling air to the preselected cooling area 68 on the forward surface of the forward attachment flange 34 from the plenum 50 near the pin 62 and the aperture 62H.

In illustrative embodiments, a third and fourth cooling-area passageway 54 extend through the carrier segment 26 near or at least partially axially forward of the first intermediate support wall 46, directing cooling air to the preselected cooling areas 68 on the aft surface of the forward attachment flange 34 from the chamber 38. The third cooling-area passageway 54 is circumferentially offset from the fourth cooling-area passageway, the third cooling-area passageway 54 formed to direct cooling air to the preselected cooling area 68 on the aft surface of the forward attachment flange 34 from the chamber 38 near the pin 60 and the aperture 60H, and the fourth cooling-area passageway 54 formed to direct cooling air to the preselected cooling area 68 on the aft surface of the forward attachment flange 34 from the chamber 38 near the pin 62 and the aperture 62H.

In illustrative embodiments, a fifth and sixth cooling-area passageways 54 extend through the carrier segment 26 near or at least partially axially aft of the second intermediate support wall 48 directing cooling air to the preselected cooling areas 68 on the forward surface of the aft attachment flange 36 from the chamber 38. The fifth cooling-area passageway 54 is circumferentially offset from the sixth cooling-area passageway, the fifth cooling-area passageway 54 formed to direct cooling air to the preselected cooling area 68 on the forward surface of the aft attachment flange 36 from the chamber 38 near the pin 60 and the aperture 60H, and the sixth cooling-area passageway 54 formed to direct cooling air to the preselected cooling area 68 on the forward surface of the aft attachment flange 36 from the chamber 38 near the pin 62 and the aperture 62H.

In some embodiments, the carrier segment 26 may be formed to include more than six cooling-area passageways 54. In some embodiments, the carrier segment 26 may be formed to include less than six cooling-area passageways 54.

Figure 5:
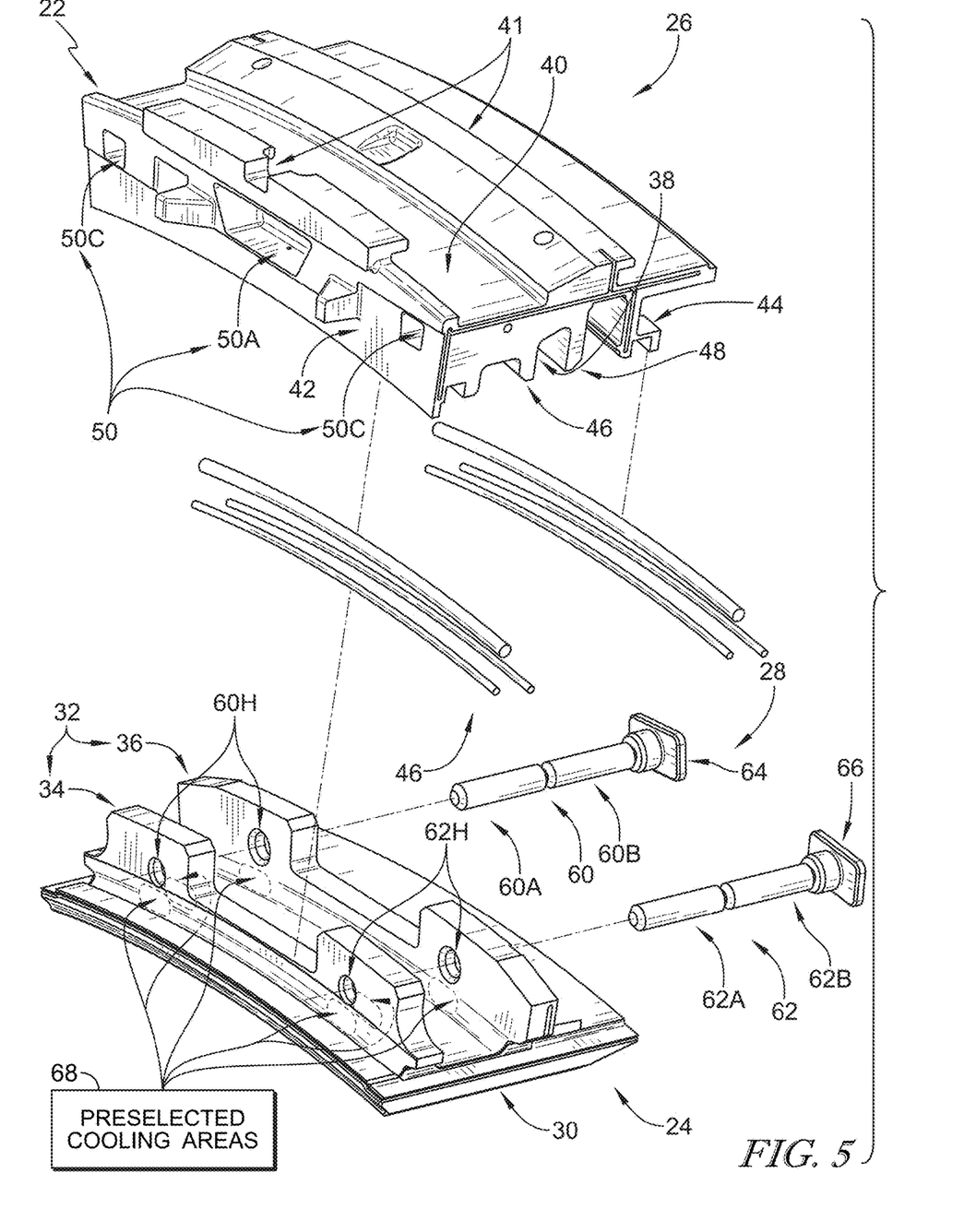
FIG. 5 is an exploded view of the turbine shroud assembly of FIG. 4 showing, from top to bottom, the turbine shroud assembly includes the carrier segment formed to define the cooling passageways, the blade track segment and preselected cooling areas, and two pins configured to extend radially through the carrier and the blade track segment to couple the blade track segment to the carrier.

The mount system 28 includes a first pin 60, a second pin 62 spaced apart circumferentially from the first pin 60, a first pin plug 64 circumferentially aligned with the first pin 60, and a second pin plug 66 circumferentially aligned with the second pin 62 as shown in FIGS. 2-10. Both the first and second pins 60, 62 extend axially into the forward support wall 42, through the first attachment flange 34, the intermediate support walls 46, 48, and the second attachment flange 36, and into the aft support wall 44 of the carrier segment 26 so as to couple the blade track segment 24 to the carrier segment 26. Each of the pin plugs 64, 66 extend into installation apertures 60H, 62H formed in the aft support wall 44 to block removal of the corresponding pins 60, 62 through the installation apertures 60H, 62H. In the illustrative embodiment, the first and second pins 60, 62 are both split pins as shown in FIGS. 2 and 5. Each pin 60, 62 includes a first pin 60A, 62A and a second pin 60B, 62B.

A method of assembling and using the turbine shroud segment 22 may include several steps. To begin assembling the turbine shroud segment 22, the method includes arranging the blade track segment 24 adjacent the carrier segment 26 so that the first attachment flange 34 and the second attachment flange 36 are located axially between the forward support wall 42 and the aft support wall 44 of the carrier segment 26. The blade track segment 24 is arranged adjacent the carrier segment 26 so that holes in the attachment flanges 34, 36 align with the holes in the support walls 42, 44, 46, 48 of the carrier segment 26.

The method continues by inserting the first pin 60 through the aft support wall 44, the second attachment flange 36, the intermediate support walls 46, 48, and the first attachment flange 34 and into the forward support wall 42 to couple the blade track segment 24 to the carrier segment 26. The method further includes inserting the second pin 62 through the aft support wall 44, the second attachment flange 36, the intermediate support walls 46, 48, and the first attachment flange 34 and into the forward support wall 42 to couple the blade track segment 24 to the carrier segment 26.

The method may further include inserting the first pin plug 64 into the installation aperture 60H and inserting the second pin plug 66 into the installation aperture 62H. The pin plugs 64, 66 are inserted into the corresponding installation apertures 60H, 62H to block removal of the pins 60, 62.

Once the blade track segment 24 is coupled to the carrier segment 26, the method continues by conducing the flow of cooling air through the cooling passageways 52, 54, 56 into the chamber 38 formed radially between the carrier segment and the blade track segment 24 to cool the blade track segment 24. The method further includes diffusing the flow of cooling air as the cooling air is conducted in the chamber 38 to avoid localized high thermal gradient areas on the shroud wall of the blade track segment 24.

For the purposes of the present disclosure, the modifier about means±1% of the given value. Of course, greater or lesser deviation is contemplated and may be used in processed method within the spirit of this disclosure.

While the disclosure has been illustrated and described in detail in the foregoing drawings and description, the same is to be considered as exemplary and not restrictive in character, it being understood that only illustrative embodiments thereof have been shown and described and that all changes and modifications that come within the spirit of the disclosure are desired to be protected.

What is claimed is:
1. A turbine shroud assembly for use with a gas turbine engine, the turbine shroud assembly comprising
   a blade track segment made of ceramic matrix composite materials having a shroud wall that extends circumferentially partway around an axis and an attachment flange that extends radially outward from the shroud wall away from the axis, a pin that extends parallel to the axis into a metallic support structure and through an aperture in the attachment flange of the blade track segment so as to couple the blade track segment to the metallic support structure, and a cooling passageway formed in the metallic support structure, the cooling passageway shaped to direct cooling air onto a preselected cooling area of the attachment flange included in the blade track segment, the preselected cooling area located radially between the shroud wall and the pin as well as being circumferentially aligned with the pin so that heat absorbed by the shroud wall during use of the turbine shroud assembly is dissipated by the cooling air directed onto the preselected cooling area before being conducted to the pin so as to manage pin-deformation and pin-life, an inlet of the cooling passageway offset from an outlet of the cooling passageway in a radial direction and in at least one of an axial direction relative to the axis or a circumferential direction relative to the axis, wherein the metallic support structure includes a cooling air plenum, the cooling passageway in fluid communication with the cooling air plenum to conduct the cooling air through a wall of the metallic support structure to the preselected cooling area, wherein the attachment flange is a first attachment flange, the blade track segment further comprising a second attachment flange that extends radially outward from the shroud wall, the second attachment flange spaced apart axially from the first attachment flange, and wherein the metallic support structure includes a first intermediate support wall that extends radially inward from an outer wall of the metallic support structure axially aft of the first attachment flange and a second intermediate support wall that extends radially inward from the outer wall of the metallic support structure axially forward of the second attachment flange and spaced apart axially from the first intermediate support wall to define a chamber.

2. The turbine shroud assembly of claim 1, wherein the preselected cooling area is disposed at least partially on an axially forward facing surface of the attachment flange.

3. The turbine shroud assembly of claim 2, wherein the preselected cooling area is disposed at least partially on an axially aft facing surface of the attachment flange.

4. The turbine shroud assembly of claim 1, wherein the aperture is a first aperture, the attachment flange further comprising a second aperture spaced circumferentially from the first aperture, and wherein a respective preselected cooling area is disposed radially inward of each one of the first aperture and the second aperture.

5. The turbine shroud assembly of claim 1, wherein the metallic support structure further includes a forward support wall axially forward of the first attachment flange so that the first attachment flange is located axially between the forward support wall and the first intermediate support wall, and wherein the cooling passageway includes a cooling-area passageway extending axially and radially through the metallic support structure at least partially axially forward of the forward support wall to conduct the cooling air from the cooling air plenum to the preselected cooling area.

6. The turbine shroud assembly of claim 5, wherein at least a portion of the cooling-area passageway extend in both axially and circumferentially though the metallic support structure.

7. The turbine shroud assembly of claim 5, wherein at least a portion of the cooling-area passageway extends radially through the metallic support structure.

8. The turbine shroud assembly of claim 1, wherein the cooling passageway includes a radial passageway extending radially through the metallic support structure to conduct the cooling air from the cooling air plenum to the chamber and a cooling-area passageway extending axially through the metallic support structure to conduct the cooling air from the plenum to at least one of the preselected cooling areas.

9. The turbine shroud assembly of claim 8, wherein the cooling-area passageway includes a forward cooling-area passageway and an aft cooling-area passageway, the forward cooling-area passageway extending through the metallic support structure aft of the first attachment flange and the aft cooling-area passageway extending through the metallic support structure forward of the second attachment flange.

10. The turbine shroud assembly of claim 1, wherein the aperture is a first aperture, the attachment flange further comprising a second aperture spaced circumferentially from the first aperture, and wherein the cooling passageway includes a first passageway at least partially circumferentially aligned adjacent to the first aperture and a second passageway spaced apart circumferentially from the first passageway and at least partially circumferentially aligned adjacent to the second aperture.

11. The turbine shroud assembly of claim 10, wherein the pin includes a first pin and a second pin that each extend axially into the metallic support structure and through the attachment flange of the blade track segment, the first pin extending through the first aperture and the second pin extending through the second aperture, wherein the first passageway is configured to direct the cooling air towards a respective preselected cooling area disposed near the first pin and the first aperture, and the second passageway is configured to direct the cooling air towards a respective preselected cooling area disposed near the second pin and the second aperture.

12. The turbine shroud assembly of claim 11, wherein the first passageway and the second passageway each includes a forward cooling-area passageway and an aft cooling-area passageway, each of the forward cooling-area passageways extending through the metallic support structure at least partially forward of the first intermediate support wall aft of the first attachment flange and each of the aft cooling-area passageway extending through the metallic support structure at least partially aft of the second intermediate support wall aft of the first intermediate support wall and forward of the second attachment flange.

13. The turbine shroud assembly of claim 12, wherein a respective angle of each of the forward cooling-area passageways and each of the aft cooling-area passageway with respect to the shroud wall is angled to direct the cooling air at a respective preselected cooling area.

14. The turbine shroud assembly of claim 12, wherein a respective angle of each of the forward cooling-area passageways and each of the aft cooling-area passageway with respect to an axially extending plane perpendicular to the shroud wall is angled to direct the cooling air at a respective preselected cooling area.

15. The turbine shroud assembly of claim 1, wherein an outlet of the cooling passageway is disposed in a radially extending wall of the metallic support structure across from the preselected cooling area, the outlet of the cooling passageway offset from an inlet of the cooling passageway in at least one of the circumferential or axial direction.

\* \* \* \* \*